US012601595B2

(12) United States Patent
Digonnet et al.

(10) Patent No.: US 12,601,595 B2
(45) Date of Patent: Apr. 14, 2026

(54) FIBER OPTIC GYROSCOPE WITH OPTICAL GATING FOR SPIKE SUPPRESSION

(71) Applicant: The Board of Trustees of the Leland Stanford Junior University, Palo Alto, CA (US)

(72) Inventors: Michel J.F. Digonnet, Palo Alto, CA (US); Jonathan M. Wheeler, Mountain View, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1365 days.

(21) Appl. No.: 17/140,994

(22) Filed: Jan. 4, 2021

(65) Prior Publication Data

US 2024/0401950 A1 Dec. 5, 2024

Related U.S. Application Data

(60) Provisional application No. 62/959,090, filed on Jan. 9, 2020.

(51) Int. Cl.
*G01C 19/72* (2006.01)
*G02F 1/35* (2006.01)

(52) U.S. Cl.
CPC ........... *G01C 19/721* (2013.01); *G01C 19/72* (2013.01); *G02F 1/3519* (2013.01)

(58) Field of Classification Search
CPC ...... G01C 19/721; G01C 19/72; G02F 1/3519
See application file for complete search history.

(56) References Cited

U.S. PATENT DOCUMENTS 4,728,192 A 3/1988 Shaw et al.
4,773,759 A 9/1988 Bergh et al.
(Continued)

FOREIGN PATENT DOCUMENTS

CN 103591946 B 3/2017
JP H10-318761 A 12/1998
(Continued)

OTHER PUBLICATIONS

Extended European Search Report for EP 21150802.3 dated Aug. 12, 2021 in 13 pgs.
(Continued)

*Primary Examiner* — Dominic J Bologna
(74) *Attorney, Agent, or Firm* — KATTEN MUCHIN ROSENMAN LLP

(57) ABSTRACT

A fiber optic gyroscope includes an optical fiber coil, at least one optical circuit, and at least one optical gate. The at least one optical circuit is configured to receive input optical signals generated by at least one optical source, to split each input optical signal into first and second optical signals, to phase modulate one or both of the first and second optical signals, to transmit the first and second optical signals to the optical fiber coil such that the first and second optical signals counterpropagate through the optical fiber coil, to receive the first and second optical signals after counterpropagating through the optical fiber coil, to combine the first and second optical signals after counterpropagating through the optical fiber coil, and to transmit the combined first and second optical signals to at least one photodetector. The at least one optical gate is configured to controllably time modulate the input optical signals and/or the first and second optical signals prior to being combined, said time modulating synchronized with said phase modulating.

20 Claims, 12 Drawing Sheets

(56) References Cited

U.S. PATENT DOCUMENTS

| | | | | | |
|---|---|---|---|---|---|
| 4,872,754 | A | * | 10/1989 | Ensley | G01C 19/726 |
| | | | | | 356/464 |
| 5,331,404 | A | | 7/1994 | Moeller et al. | |
| 5,430,545 | A | | 7/1995 | Kovacs | |
| 5,469,257 | A | | 11/1995 | Blake et al. | |
| 5,850,286 | A | * | 12/1998 | Auerbach | G01C 19/72 |
| | | | | | 356/460 |
| 5,914,781 | A | * | 6/1999 | Jaklitsch | G01C 19/72 |
| | | | | | 356/464 |
| 9,121,708 | B1 | * | 9/2015 | Qiu | G01C 19/723 |
| 2003/0198424 | A1 | | 10/2003 | Bennet | |
| 2011/0037972 | A1 | * | 2/2011 | Bergh | G01B 9/0209 |
| | | | | | 356/73.1 |
| 2016/0231120 | A1 | * | 8/2016 | Guattari | G02B 6/29347 |

FOREIGN PATENT DOCUMENTS

| | | | |
|---|---|---|---|
| JP | 2000180184 | A | 6/2000 |
| JP | 2011-123058 | A | 6/2011 |
| JP | 2013-096995 | A | 5/2013 |

OTHER PUBLICATIONS

Chamoun et al., "Noise and bias error due to polarization coupling in a fiber optic gyroscope." *Journal of Lightwave Technology*, Jul. 1, 2015, vol. 33, No. 13. pp. 2839-2847.

Chamoun et al., "Aircraft-navigation-grade laser-driven FOG with Gaussian-noise phase modulation." *Optic Letters*, Apr. 15, 2017, vol. 42, No. 8. pp. 1600-1603.

Lefevre, "The Fiber-Optic Gyroscope," Boston: Artech House., 2014, 2nd Ed., pp. 44-45.

Lloyd et al., "Modeling Coherent Backscattering Errors in Fiber Optic Gyroscopes for Sources of Arbitrary Line Width," *Journal of Lightwave Technology.*, Jul. 1, 2013, vol. 31, No. 13, pp. 2070-2078.

Morris et al., "Broadened-laser-driven polarization-maintaining hollow-core fiber optic gyroscope," *Journal of Lightwave Technology*, Feb. 15, 2020, vol. 38, Issue 4, pp. 905-911.

Yang et al., "Estimation of gyro bias drift due to distributed polarization cross coupling in the fiber coil," *Optic Express*, Apr. 1, 2019, vol. 47, No. 7. pp. 10247-10257.

Extended Search Report received in European Application No. 23198924.5. dated Mar. 19, 2024.

Japanese Office Action for Application No. 2021-002093, dated Jan. 25, 2022, in 3 pages.

Office Action in European Application 21150802.3, dated Jun. 23, 2022 in 9 pages.

The extended European search report dated Jan. 30, 2026, from European Patent Application No. 25216488.4, 6 sheets.

* cited by examiner

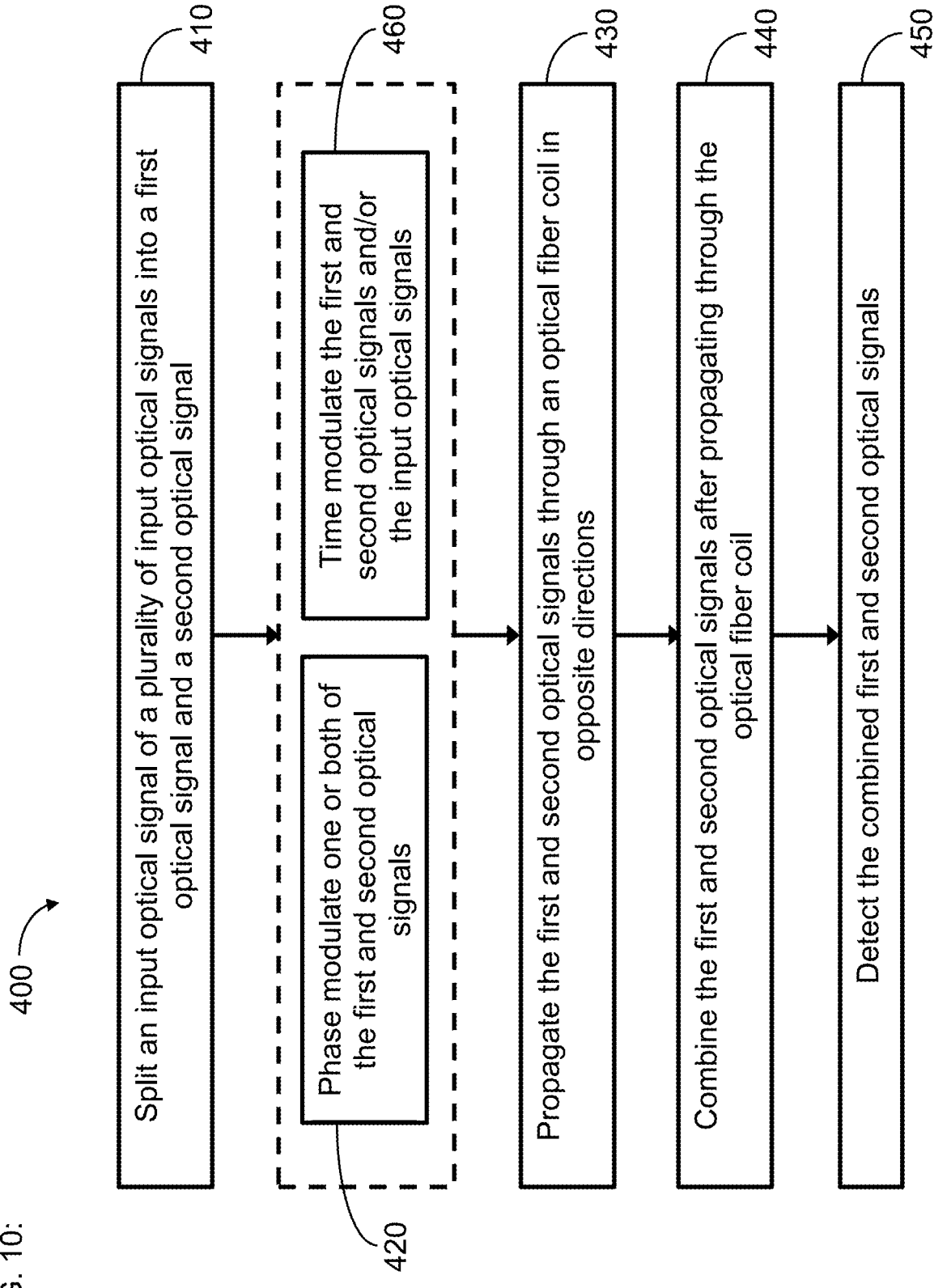

Split an input optical signal of a plurality of input optical signals into a first optical signal and a second optical signal — 410

Phase modulate one or both of the first and second optical signals — 420

Time modulate the first and second optical signals and/or the input optical signals — 460

Propagate the first and second optical signals through an optical fiber coil in opposite directions — 430

Combine the first and second optical signals after propagating through the optical fiber coil — 440

Detect the combined first and second optical signals — 450

1

FIBER OPTIC GYROSCOPE WITH OPTICAL GATING FOR SPIKE SUPPRESSION

CLAIM OF PRIORITY

This application claims the benefit of priority to U.S. Provisional Appl. No. 62/959,090, filed Jan. 9, 2020, which is incorporated in its entirety by reference herein.

BACKGROUND

Field

This application is generally directed to fiber optic gyroscopes.

Description of the Related Art

Fiber optic gyroscopes (FOGs) are frequently used in rotation rate sensing. In order to linearize their response, increase their sensitivity, and reduce their noise, it is common in the art to implement a phase modulator in one or both of the arms of the sensing coil of the Sagnac interferometer near the Y-junction in order to optically bias the interferometer.

SUMMARY

In certain implementations, a fiber optic gyroscope is provided, the fiber optic gyroscope comprises an optical fiber coil, at least one optical circuit, and at least one optical gate. The at least one optical circuit is in optical communication with the optical fiber coil and is configured to be in optical communication with at least one optical source. The at least one optical circuit is further configured to receive input optical signals generated by the at least one optical source, to split each input optical signal into a first optical signal and a second optical signal, to phase modulate one or both of the first optical signal and the second optical signal, to transmit the first optical signal and the second optical signal to the optical fiber coil such that the first and second optical signals counterpropagate through the optical fiber coil, to receive the first and second optical signals after counterpropagating through the optical fiber coil, to combine the first and second optical signals after counterpropagating through the optical fiber coil, and to transmit the combined first and second optical signals to at least one photodetector. The at least one optical gate is configured to controllably time modulate the input optical signals and/or the first and second optical signals prior to being combined, said time modulating synchronized with said phase modulating.

In certain implementations, a fiber optic gyroscope is provided, the fiber optic gyroscope comprises an optical fiber coil and at least one optical circuit, and at least one optical switch. The at least one optical circuit is in optical communication with the optical fiber coil and is configured to be in optical communication with at least one optical source. The at least one optical circuit is further configured to receive input optical signals generated by the at least one optical source, to split each input optical signal into a first portion and a second portion, to split each second portion into a first optical signal and a second optical signal, to phase modulate one or both of the first optical signal and the second optical signal, to transmit the first optical signal and the second optical signal to the optical fiber coil such that the first and second optical signals counterpropagate through the optical fiber coil, to receive the first and second optical signals after counterpropagating through the optical fiber coil, and to combine the first and second optical signals after counterpropagating through the optical fiber coil. The at least one optical switch is configured to receive the first portion of the input optical signals, to receive the combined first and second optical signals from the at least one optical circuit, and to controllably switch between a first state and a second state in response to control signals from at least one waveform generator. The at least one optical switch in the first state is configured to transmit only the first portion of the input optical signals to at least one photodetector, and the at least one optical switch in the second state is configured to transmit only the combined first and second optical signals to the at least one photodetector.

In certain implementations, a method is provided, the method comprises splitting each input optical signal of a plurality of input optical signals into a first optical signal and a second optical signal. The method further comprises phase modulating one or both of the first optical signal and the second optical signal. The method further comprises propagating the first optical signal and the second optical signal through an optical fiber coil such that the first optical signal propagates along a first direction through the optical fiber coil and the second optical signal propagates along a second direction through the optical fiber coil, the second direction opposite to the first direction. The method further comprises combining the first and second optical signals after propagating through the optical fiber coil and detecting the combined first and second optical signals. The method further comprises time modulating, synchronously with said phase modulating, the first and second optical signals before said combining the first and second optical signals and/or the input optical signals.

BRIEF DESCRIPTION OF THE DRAWINGS

FIG. 10 is a flow diagram of an example method in accordance with certain implementations described herein.

DETAILED DESCRIPTION

Figure 1:
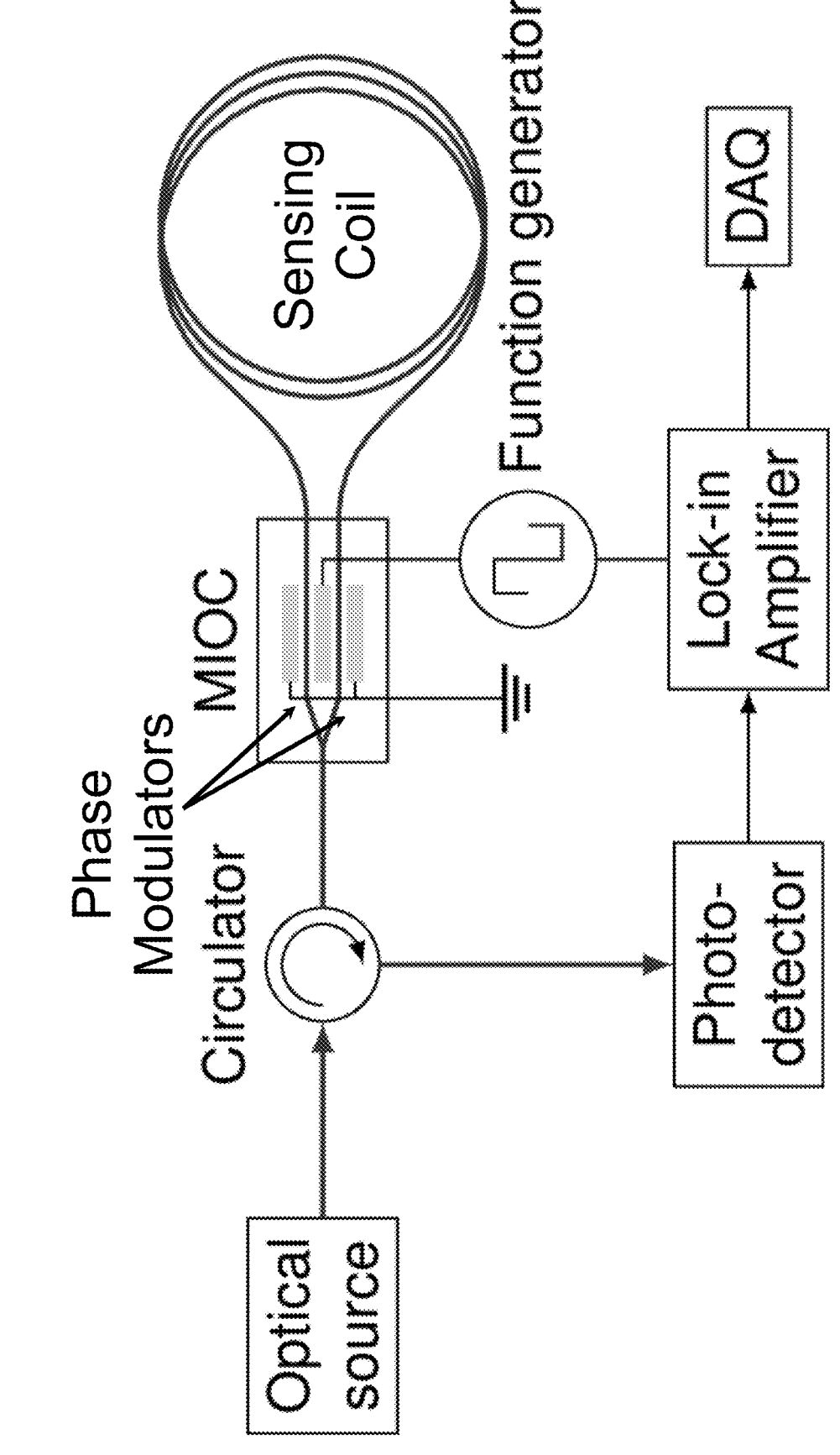
FIG. 1 schematically illustrates an example fiber optic gyroscope (FOG) dynamically biased by a function generator that drives a push-pull modulator on a multi-purpose integrated optic chip (MIOC).

FIG. 1 schematically illustrates an example fiber optic gyroscope (FOG), also known as a Sagnac interferometer, which is dynamically biased by a function generator that drives a push-pull modulator on a multi-purpose integrated optic chip (MIOC). An optical signal from an optical source is routed by a circulator towards the sensing coil. Before entering the sensing coil, the optical signal is received by a first port (e.g., an input port) of an MIOC configured to polarize and split the optical signal into two optical signals of nominally equal power and to modulate the two optical signals. The two optical signals are then transmitted by two second ports (e.g., output ports) of the MIOC and coupled into the sensing coil, one in the clockwise (CW) direction, the other in the counterclockwise (CCW) direction. After traveling through the sensing coil, the two optical signals are received by the two second ports of the MIOC, pass through the MIOC again, and are combined with one another at the Y-junction, where they interfere with one another. The interference signal is then detected by the photodetector (e.g., after being transmitted by the first port of the MIOC, through the circulator, and to the photodetector).

Both optical signals travel the same optical path but in opposite directions. In the absence of rotation and of any other nonreciprocal effects in the sensing coil, both optical signals arrive again at the Y-junction at the same instant with no time delay (or phase shift) relative to each other, and the optical signals interfere fully constructively at the first port of the MIOC (e.g., the input port; the port in optical communication with the circulator). When the sensing coil is rotated, the Sagnac effect causes the two optical signals to accumulate a phase shift relative to one another (the Sagnac phase shift), and the interference of these two optical signals is no longer fully constructive, resulting in a reduction of the output power at the first port of the MIOC. The amount of rotation can be inferred by measuring this change in the output power.

Figure 2:
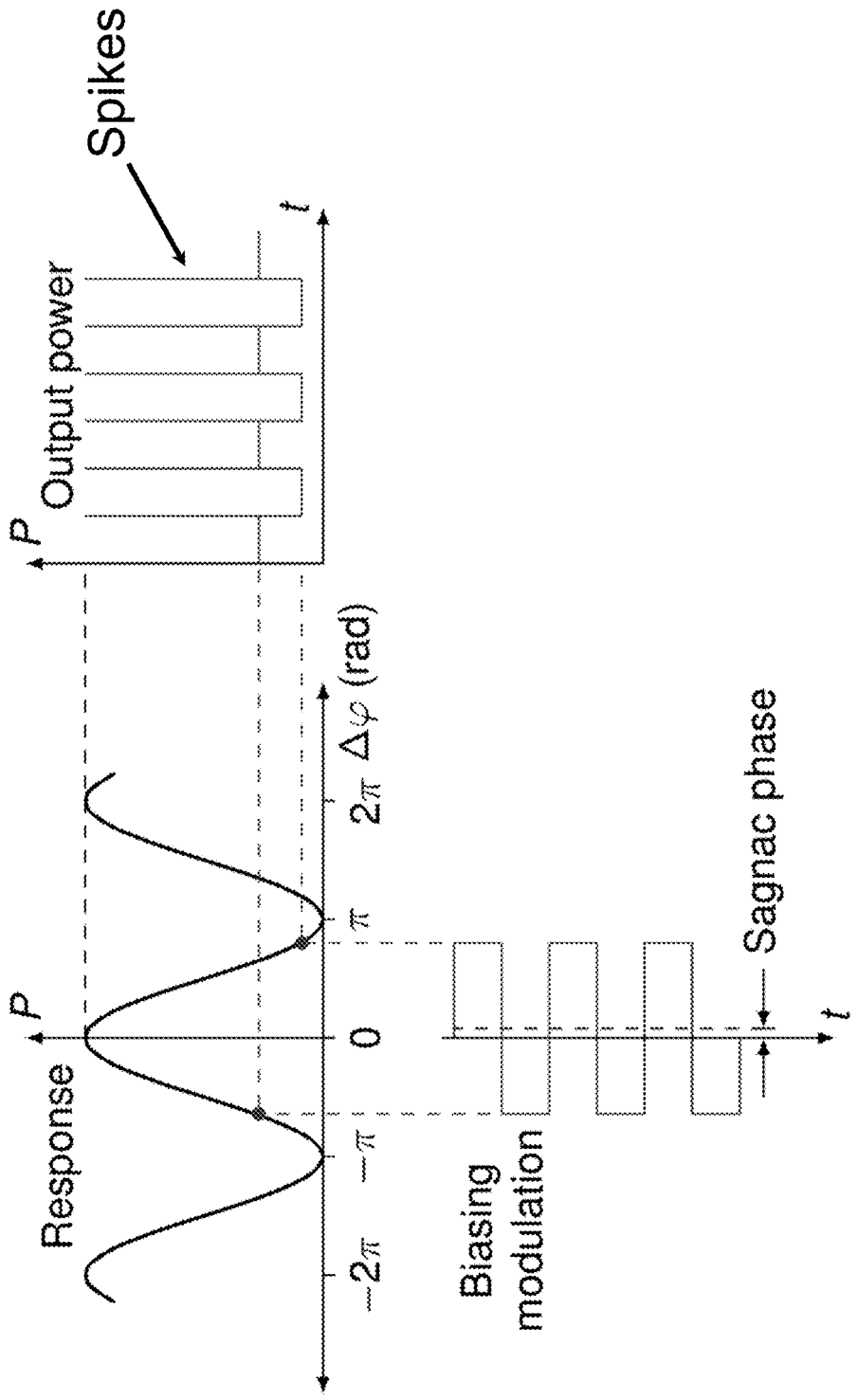
FIG. 2 schematically illustrates the interferometric output of the FOG of FIG. 1.

FIG. 2 schematically illustrates the interferometric output of the FOG of FIG. 1. When the FOG is not dynamically biased (unlike shown in FIG. 1), for small rotation rates, the Sagnac phase shift is small, which causes the interferometric output to remain in a narrow region around the top of its raised-cosine response, as shown in FIG. 2. Hence, because the slope of the response at that location is zero, a change in rotation induces a very small change in optical power (in second order to the rotation rate), resulting in a poor sensitivity.

In order to improve the sensitivity of the FOG, a biasing modulation can be supplied by one or more phase modulators at one or both of the branches of the Y-junction, as shown schematically in FIG. 1. When two phase modulators are used, they can be operated in a "push-pull" configuration, whereby the dynamic modulations applied to the two phase modulators are in opposite phase with one another, namely, at any one time (except possibly during the finite transition time) they are equal in magnitude but opposite in sign. This phase modulation is carried out at the proper frequency of the FOG's loop. The loop proper frequency is defined as $1/(2 \tau_g)$, where $\tau_g$=nL/c is the time of flight through the sensing coil, where L is the length of the sensing coil, n is the index of refraction of the fiber of the sensing coil, and c is the speed of light in a vacuum (e.g., neglecting the time of flight from each of the phase modulator to each of the second port of the MIOC).

The phase modulators can be driven by a voltage V(t) applied by a function generator as schematically illustrated by FIG. 1. A lock-in amplifier can receive the voltage V(t) and the photodetector signal, and can be configured to generate an output signal indicative of a portion of the photodetector signal having the same frequency as the voltage V(t). Digital acquisition circuitry ("DAQ") can be configured to receive the output signal from the lock-in amplifier.

The amount of phase modulation $\varphi(t)$ applied by each phase modulator to the optical signals that are combined and interfere with one another is proportional to the voltage V(t) applied by the function generator. The CCW optical signal can be phase-modulated in the top branch of the Y-junction of FIG. 1 at time t before its flight through the sensing coil, and phase-modulated again in the bottom branch of the Y-junction of FIG. 1 at time $t-\tau_g$ after its flight through the sensing coil. The CW optical signal can be phase-modulated in the bottom branch of the Y-junction of FIG. 1 at time t before its flight through the sensing coil, and phase-modulated again in the top branch of the Y-junction of FIG. 1 at time $t-\tau_g$=t−nL/c after its flight through the sensing coil. When the modulation signals of the top and bottom branches are $\varphi(t)$ and $-\varphi(t)$, respectively, the CW and CCW signals, which interfere with one another, experience a difference in phase modulation $\Delta\varphi$ at any given time t equal to:

$$\Delta\varphi(t) = (\varphi(t) - \varphi(t - \tau_g)) - (\varphi(t - \tau_g) - \varphi(t)) = 2\varphi(t) - 2\varphi(t - \tau_g)$$

To maximize the efficiency of this phase modulation scheme, the frequency of the biasing modulation waveform can equal the loop proper frequency, in which case $\varphi(t)=-\varphi(t-\tau_g)$. For example, the biasing modulation waveform can comprise a square wave having a half-period that is equal to the time of flight $\tau_g$ through the sensing coil, and having an amplitude (e.g., modulation depth) such that the induced $\Delta\varphi$ is between $\pi/2$ and $\pi$ (e.g., a modulation depth configured to optimize the signal-to-noise ratio of the FOG output signal).

While square-wave modulation affords numerous benefits, this biasing modulation waveform gives rise to periodic spikes in the interferometer output signal every time the square-wave modulation transitions from a positive to a negative value or vice versa, as shown in the right-hand side of FIG. 2 (see, e.g., H. C. Lefèvre, "*The Fiber-Optic Gyroscope*," Boston: Artech House. $2^{nd}$ Ed. pp. 44-45 (2014)). The reason for the formation of these spikes is two-fold. First, if the half-period of the modulation frequency is not exactly the time-of-flight through the sensing coil, then there will be brief moments where $\Delta\varphi$ is zero. During these brief periods (e.g., a small fraction of a half-period, namely a few hundred nanosecond or less), the interferometer is biased at the point of maximum transmission, allowing large amounts of optical power to be transmitted to the photodetector. Second, both the phase modulators and the driving electronics have finite bandwidths. As a result, it takes a finite amount of time for the biasing voltages, and therefore the phase applied to the optical signals, to change from a negative value to a positive value, or vice versa. In this brief period, the phase (e.g., applied to the phase modulator in the top branch of FIG. 1) passes through zero. During this brief time, the interferometer is momentarily biased at the top of its response where the transmission of the fiber interferometer is unity (see, e.g., FIG. 2). As a result, each time the square-wave voltages switch from a maximum to a minimum value or vice versa, a burst of optical energy is released by the interferometer and sent to the photodetector, which receives a spike of optical power. These spikes are periodic, with a frequency of twice the proper frequency. The magnitude, timing, and shape of these spikes can vary over time due to a variety of undesirable defects in the FOG system, e.g., clock jitter, electronic crosstalk, and thermal effects in the electronics, and the energy they carry therefore can also vary. Spikes can also arise in non-square-wave biasing wave forms, such as in many of the variants of digital and analog serrodynes, where the biasing signal also changes rapidly. Furthermore, a spike can also be created when the modulating voltage passes through $\pm 2nV_\pi$, where n is an integer.

If left uncorrected, these spikes can negatively impact the performance of the FOG in various ways. The spikes can saturate the photodetector, thereby momentarily reducing the response of the photodetector and making the FOG incapable of accurately measuring a rotation while the photodetector recovers. When a current spike from the photodiode is incident on the transimpedance amplifier, the transimpedance amplifier can be driven out of its linear regime, which can increase the electronic noise and alter the DC characteristics of the photodetection and demodulation circuits. Furthermore, as a result of the spikes, the transimpedance amplifier draws a large amount of current from its power supplies, and without good electrical isolation, these spikes can couple capacitively or through the power supplies into other demodulation electronics. Because the spikes occur at twice the frequency of the demodulation electronics, any asymmetry between even-numbered and odd-numbered spikes (e.g., which can arise from a mismatch between biasing frequency and time of flight through the sensing coil) can be spuriously demodulated as a rotation, which can lead to increased angular random walk (ARW) and drift.

Figure 3:
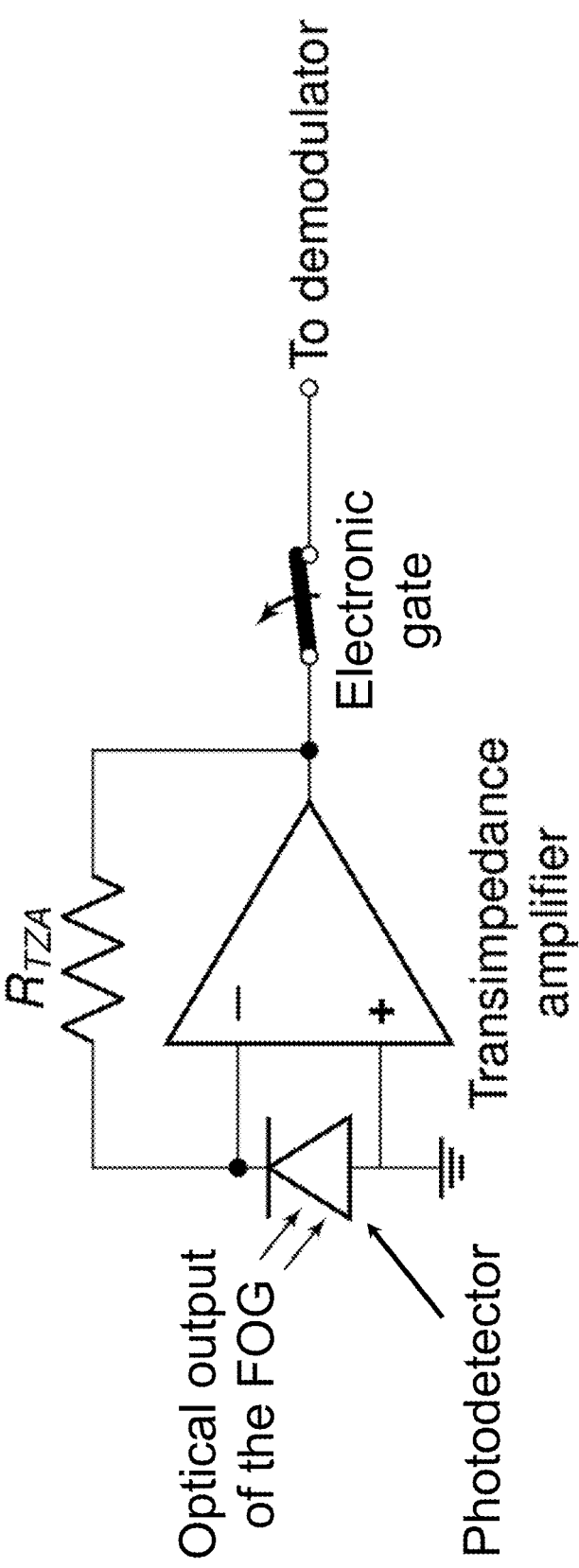
FIG. 3 schematically illustrates a transimpedance amplifier with an electronic gate that can open to prevent spikes from passing to the demodulation electronics.

Conventionally, these spikes can be removed with an electronic gate placed between the photodetector and the demodulation circuit. FIG. 3 schematically illustrates a transimpedance amplifier with an electronic gate that can open to prevent spikes from passing to the demodulation electronics. The optical output of the FOG (see, e.g., top right diagram of FIG. 2) can be converted to a voltage by means of a photodiode and a transimpedance amplifier, as shown in FIG. 3. An electronic gate between the transimpedance amplifier and the demodulation electronics can be turned on and off at twice the proper frequency and timed such that the electronic gate selectively transmits the useful FOG output signal to the demodulation electronics and blocks the spikes.

However, the electronic solution schematically illustrated by FIG. 3 does not perfectly solve the problem of the spikes. The transimpedance amplifier can still create a voltage spike at its output whenever the photodiode observes a spike in optical power. If the optical power and transimpedance gain are both large, the transimpedance amplifier can be driven out of its linear regime or saturate. Furthermore, the output signal of the transimpedance amplifier can still couple into the demodulation electronics either capacitively or through the power lines. As mentioned earlier, the spikes occur at twice the demodulation frequency, and can cause shot-toshot variations to create noise, and any asymmetries between odd-numbered and even-numbered spikes to produce a spurious drift term.

In certain implementations described herein, the spikes are removed from the operation of a FOG using optical gating. As used herein, the term "optical gating" has its broadest reasonable meaning, including but not limited to, controllably time modulating (e.g., turning on and off as a function of time) one or more of the optical signals provided to the sensing coil of the Sagnac interferometer and/or one or more of the optical signals received from the sensing coil. Optical gating has the advantage over electrical gating that optical gating can eliminate saturation of the photodiode, and the transimpedance amplifier does not have to respond to a high-intensity high-bandwidth spike. Thus, optical gating can improve the stability of the electronics and can reduce crosstalk between the transimpedance amplifier and the demodulating electronics. In certain implementations described herein, optical gating is used instead of, or in addition to, electronic gating.

Figure 4:
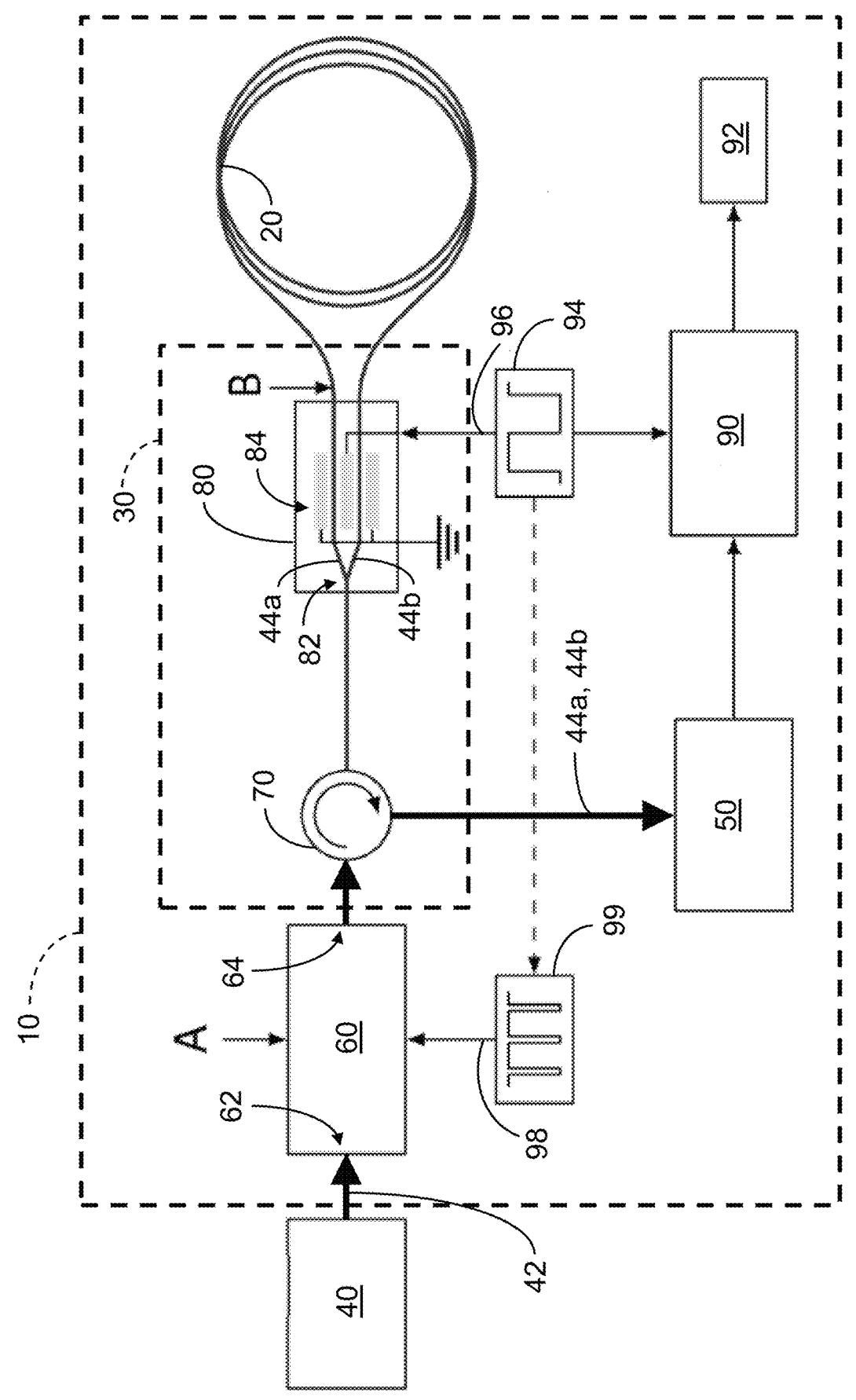
FIG. 4 schematically illustrates an example FOG utilizing optical gating in accordance with certain implementations described herein.

FIG. 4 schematically illustrates an example FOG 10 utilizing optical gating in accordance with certain implementations described herein. The FOG 10 comprises an optical fiber coil 20 and at least one optical circuit 30 in optical communication with the optical fiber coil 20 and configured to be in optical communication with at least one optical source 40. The at least one optical circuit 30 is configured to receive input optical signals 42 generated by the at least one optical source 40, to split each input optical signal 42 into a first optical signal 44a and a second optical signal 44b, to phase modulate one or both of the first optical signal 44a and the second optical signal 44b, to transmit the first optical signal 44a and the second optical signal 44b to the optical fiber coil 20 such that the first and second optical signals 44a, 44b counterpropagate through the optical fiber coil 20, to receive the first and second optical signals 44a, 44b after counterpropagating through the optical fiber coil 20, to combine the first and second optical signals 44a, 44b after counterpropagating through the optical fiber coil 20, and to transmit the combined first and second optical signals 44a, 44b to at least one photodetector 50. The FOG 10 further comprises at least one optical gate 60 configured to controllably time modulate the input optical signals 42 and/or the first and second optical signals 44a, 44b prior to being combined, said time modulating synchronized with said phase modulating. For example, the first and second optical signals 44a, 44b can be controllably time modulated prior to counterpropagating through the optical fiber coil 20, while counterpropagating through at least a portion of the optical fiber coil 20, and/or after counterpropagating through the optical fiber coil 20. For another example, the input optical signals 42 can be controllably time modulated prior to being received by the at least one optical circuit 30.

The optical fiber coil 20 (e.g., sensing coil) of certain implementations comprises a quadrupolar-wound polarization-maintaining (PM) optical fiber wound in a coil (e.g., having a substantially circular shape with a diameter in the range of 5 cm to 25 cm and a coil length in a range of 500 m to 5000 m). Examples of the optical source 40 include but are not limited to: linewidth-broadened laser; non-broadened laser; broadband light source (e.g., Er-doped superfluorescent fiber source); and light-emitting diode.

In certain implementations (see, e.g., the example FOG 10 of FIG. 4), the at least one optical circuit 30 comprises a circulator 70 configured to receive the input optical signals 42 and a multi-purpose integrated optic chip (MIOC) 80 (e.g., fabricated in $LiNbO_3$). In certain implementations, the circulator 70 is separate from the MIOC 80 but in optical communication with the MIOC 80 via at least one optical fiber of the at least one optical circuit 30, while in certain other implementations, the circulator 70 is integrated as a component of the MIOC 80. The circulator 70 is configured to receive and transmit at least a portion of the input optical signals 42 to the MIOC 80 and the MIOC 80 is configured to split the input optical signals 42 into the first optical signal 44a and the second optical signal 44b (e.g., such that the first and second optical signals 44a, 44b have substantially equal power), to modulate the first and second optical signals 44a, 44b, and to transmit the modulated first and second optical signals 44a, 44b to enter the optical fiber coil 20, one in the clockwise (CW) direction, the other in the counterclockwise (CCW) direction.

In certain implementations, the MIOC 80 is further configured to receive the first and second optical signals 44a, 44b after traveling through the optical fiber coil 20, and to combine the first and second optical signals 44a, 44b with one another, where they interfere with one another. The circulator 70 is configured to receive the combined first and second optical signals 44a, 44b (e.g., an interference signal) from the MIOC 80 and to transmit the first and second optical signals 44a, 44b to the at least one photodetector 50.

For example, the MIOC 80 can comprise an optical fiber Y-junction 82 in optical communication with the circulator 70 and configured to split the input optical signals 42 into the first and second optical signals 44a, 44b. The MIOC 80 can further comprise one or more phase modulators 84 in optical communication with the Y-junction 82 and configured to modulate the first and second optical signals 44a, 44b (e.g., to apply a square-wave modulation at the loop proper frequency to the first and second optical signals 44a, 44b for dynamically biasing of the FOG 10). In certain implementations, the MIOC 80 further comprises at least one integrated polarizer (not shown) configured to polarize the input optical signals 42 and the optical fibers of the at least one optical circuit 30 are PM optical fibers.

In certain implementations, as schematically illustrated by FIG. 4, the FOG 10 further comprises the at least one photodetector 50, a lock-in amplifier 90, digital acquisition (DAQ) circuitry 92, and a waveform (e.g., square-wave) generator 94. The lock-in amplifier 90 can be configured to receive photodetector signals from the at least one photodetector 50 and a waveform (e.g., square-wave) electrical signal (the same signal provided to the one or more phase modulators 84) from the waveform generator 94, and to demodulate the photodetector signals. The DAQ circuitry 92 can be configured to receive and measure the output signal from the lock-in amplifier 90.

In certain implementations, the at least one optical gate 60 (e.g., an optical intensity modulator; an optical amplitude modulator) comprises an input port 62 and an output port 64 and is in the optical path between the optical source 40 and the circulator 70 (e.g., at a location labeled "A" in FIG. 4). In certain other implementations, the at least one optical gate 60 is located between the MIOC 80 and the optical fiber coil 20 (e.g., at a location labeled "B" in FIG. 4) or is located at a position along the optical fiber coil 20. Examples of the at least one optical gate 60 in accordance with certain implementations described herein include, but are not limited to: optical intensity modulators of several different varieties (e.g., based on the electro-optic effect using lithium niobate or other nonlinear crystals; acousto-optic modulators using various materials; liquid-crystals modulators, etc.); and optical switches.

Other example FOGs 10 in accordance with certain implementations described herein further include other components. For example, the FOG 10 can include one or more sensors and circuitry (e.g., microcontroller) configured to measure the temperature of the optical fiber coil 10 and to protect against drifts due to variations of temperature gradients over time; one or more mu-metal structures (e.g., enclosure; can) configured to protect against drifts due to variations in the Earth's magnetic field.

The at least one optical gate 60 (e.g., optical intensity modulator) of certain implementations is configured to controllably and selectively (e.g., depending on a control voltage supplied to the optical intensity modulator) either (i) transmit a substantial fraction (e.g., at least 25%; at least 30%; at least 40%; at least 50%; substantially all) of the optical signal received at one port (e.g., the input port 62; the output port 64) to the other port, or (ii) prevent (e.g., block) a substantial fraction (e.g., at least 25%; at least 30%; at least 40%; at least 50%; substantially all) of the optical signal received at one port (e.g., the input port 62; the output port 64) from being transmitted to the other port. The at least one optical gate 60 can be driven (e.g., by the control voltage) such that (i) it blocks transmission of a substantial fraction of the optical signal from the input port 62 to the output port 64 (and/or vice versa) during the period when the square-wave biasing signal is changing, and (ii) it transmits a substantial fraction of the optical signal from the input port 62 to the output port 64 (and/or vice versa) at all other times, with the optical power of the optical signal portions transmitted during the period when the square-wave biasing signal is changing less than the optical power of the optical signal portions transmitted during all other times. For example, the at least one waveform generator 94 (e.g., single-output waveform generator; multiple-output waveform generator) can be used to supply both a biasing modulation 96 (e.g., a square-wave electrical signal) to the one or more phase modulators 84 and an electrical pulse train 98 (e.g., from a pulse generator 99) to the at least one optical gate 60, the biasing modulation 96 and electrical pulse train 98 synchronized with one another such that the one or more phase modulators 84 and the at least one optical gate 60 are synchronized with one another.

In certain implementations, the at least one optical gate 60 is configured to re-route (e.g., multiplex; tap out) at least a portion of the optical power from a location within the optical circuit 30 towards at least one other photodetector (not shown) configured to monitor the power at the location. For example, the at least one optical gate 60 can comprise an optical switch configured to re-route at least some of the photons of the spike light towards the at least one other photodetector. For another example, the at least one optical gate 60 can comprise an optical switch configured to send photons that otherwise would be turned into a spike into a sub-system (not shown) configured to monitor the mean-wavelength stability and/or some other meaningful quantity of the FOG 10, and/or of an entirely different fiber optic sensing apparatus. For example, time-division multiplexing (e.g., at a duty cycle of 50/50, 60/40, or 70/30) can be performed of a common optical source between the FOG 10 and another fiber optic sensor (e.g., a phase-front modulation acoustic sensor).

Figure 5A:
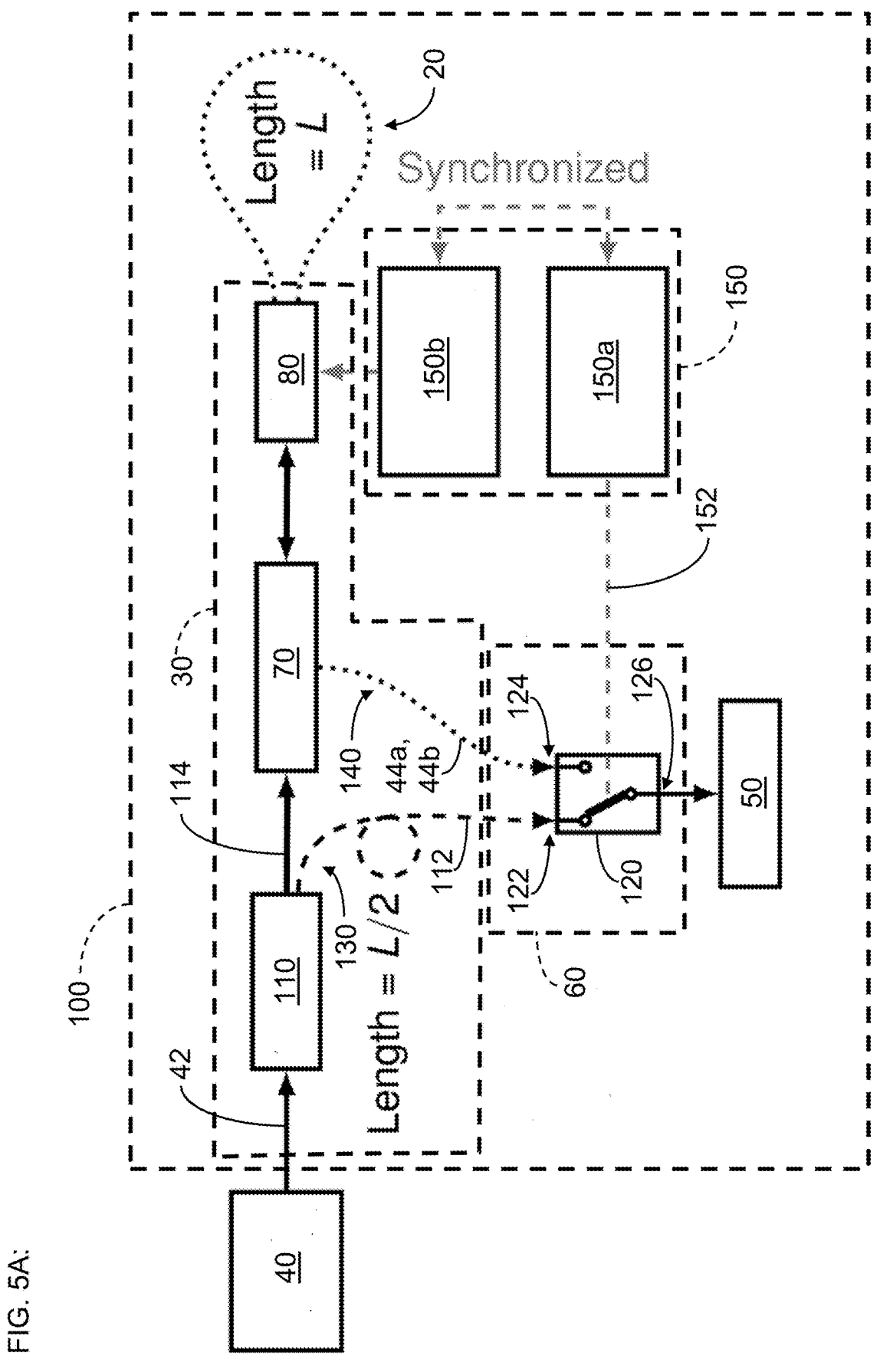
FIG. 5A schematically illustrates an example FOG configured for correcting for laser relative intensity noise (RIN) in accordance with certain implementations described herein.

FIG. 5A schematically illustrates an example FOG 100 configured for correcting for laser relative intensity noise (RIN) in accordance with certain implementations described herein. In certain such implementations, the example FOG 100 of FIG. 5A is configured to suppress laser spikes and to reduce RIN without making use of an electronic gate or a second photodetector, thereby providing advantages over other systems (see, e.g., U.S. Pat. Nos. 5,331,404 and 5,469,257 and U.S. Pat. Appl. Publ. No. 2003/0198424). In certain implementations, the at least one optical circuit 30 comprises an optical coupler 110 (e.g., Y-junction) configured to receive the input optical signals 42 from the at least one optical source 40 and to split off (e.g., tap out) a first portion 112 of the input optical signals 42 and to transmit a second portion 114 (e.g., more than 50%; more than 90%) to the circulator 70. The optical coupler 110 has a coupling ratio configured to provide a predetermined ratio of the power of the first portion 112 and the power of the second portion 114. As shown in FIG. 5A, the first portion 112 is transmitted to a first input port 122 of an optical switch 120 of the at least one optical gate 60 via an optical fiber delay line 130 with a length that is substantially equal to one-half the coil length L of the optical fiber coil 20. In certain implementations, the combined first and second optical signals 44a, 44b are transmitted by the circulator 70 to a second input port 124 of the optical switch 120 via an optical fiber gyro line 140.

In certain implementations, an output port 126 of the optical switch 120 is in optical communication with a photodetector 50. The optical switch 120 is configured to toggle between a first state and a second state in response to control signals 152 from at least one waveform generator 150. In certain implementations, as schematically illustrated by FIG. 5A, the at least one waveform generator 150 can comprise a first waveform generator 150a configured to output the control signals 152 to the optical switch 120 and a second waveform generator 150b configured to output control signals to the MIOC 80, the first and second waveform generators 150a, 150b synchronized with one another.

In the first state, the optical switch 120 is configured to transmit only the first portion 112 of the input optical signals 42 (e.g., the delay-line signal) to the photodetector 50. In the second state, the optical switch 120 is configured to transmit only the combined first and second optical signals 44a, 44b (e.g., the gyro signal) to the photodetector 50. In this way, the photodetector 50 is configured to detect both the delay-line signal and the gyro signal.

The output $P_d$ of the delay line 130 transmitted to the first input port 122 of the optical switch 120 is proportional to the laser power $P_l$ received by the optical coupler 110 delayed by the delay-line propagation time:

$$P_d(t) = \alpha_d P_l\left(t - n(L/2)/c\right)$$

where $\alpha_d$ is the power attenuation of the delay line 130 (e.g., due to the coupling ratio of the optical coupler 110 and the excess loss in the delay line 130), n is the refractive index of the delay line 130, L/2 is the length of the delay line 130, and c is the speed of light through a vacuum.

The output $P_g$ of the gyro line 140 transmitted to the second input port 124 of the optical switch 120 is proportional to the laser power $P_l$ received by the optical coupler 110 delayed by the propagation time through the optical fiber coil 20 and the gyro line 140, and attenuated by the response of the gyroscope (e.g., the at least one optical circuit 30 and the optical fiber coil 20):

$$P_g(t) = \alpha_g P_l\left(t - nL/c\right)\left(1 + \cos(2\varphi(t) - 2\varphi(t - nL/c))\right)/2$$

where $\alpha_g$ is the power attenuation of the gyroscope (e.g., due to the coupling ratio of the optical coupler 110, the coupling ratio of the optical paths of the gyroscope, and the excess loss in the optical components of the gyroscope), n is the refractive index of the optical fibers of the gyroscope, L is the length of the optical fiber coil 20, and $\varphi(t)$ is the phase applied by the one or more phase modulators 84 at time t.

Figure 5B:
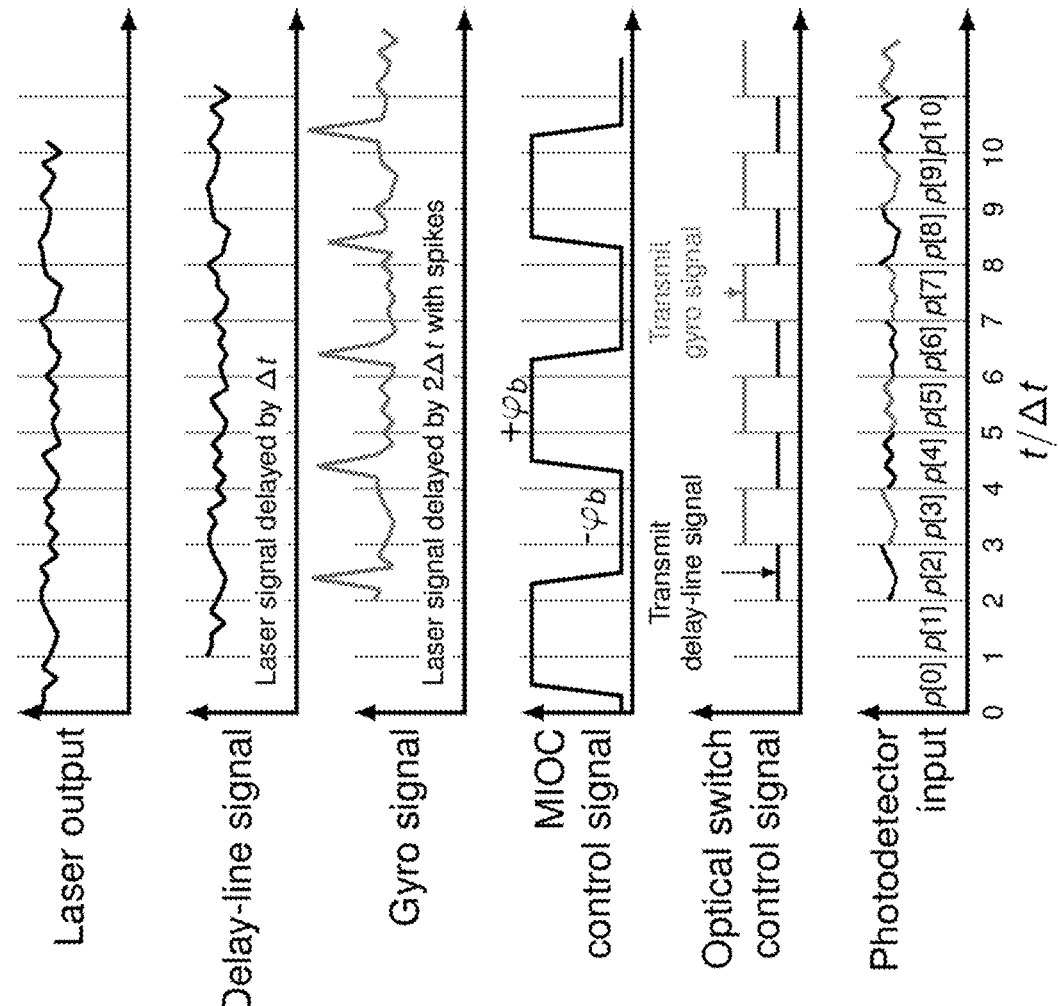
FIG. 5B is an example timing diagram in accordance with certain implementations described herein.

FIG. 5B is an example timing diagram in accordance with certain implementations described herein. As shown in FIG. 5B, while the biasing modulation is not changing, the optical switch 120 is configured to pass the gyro signal to the photodetector 50. When the bias modulation is changing, a spike is generated in the gyro output. During these times, the optical switch 120 is configured to transmit the delay-line signal to the photodetector 50. The signal received by the photodetector 50 is the concatenation of the delay-line signal and the gyro signal. In certain implementations, the optical switch 120 toggles between the two input ports 122, 124 such that each of the delay-line signal and the gyro signal is transmitted for an integration time $\Delta t$ of nL/(2c) before the optical switch 120 toggles to the other input port. In certain implementations, an analog-to-digital converter integrates the signal generated by the photodetector 50 over integration time [t, t+$\Delta t$], and the integrated signal is stored as a discrete measurement p[i] where i=floor(t/$\Delta t$).

FIG. 5B shows how certain implementations described herein can be used to simultaneously reduce (e.g., remove) the RIN and suppress the spikes. The top frame of FIG. 5B shows the output of a laser with RIN. The second frame of FIG. 5B shows the delay-line signal in solid black, which is a copy of the laser signal delayed by $\Delta t$ and attenuated by $\alpha_d$. The third frame of FIG. 5B shows the gyro signal in gray, which is the copy of a laser signal delayed by 2$\Delta t$, attenuated by $\alpha_g$, and corrupted by spikes. The fourth frame of FIG. 5B shows the control signals transmitted by the at least one waveform generator 150 to the MIOC 80 (e.g., to bias the FOG 100). The finite rise times and fall times of this control signal cause the spikes in the gyro signal shown in the third frame. The fifth frame of FIG. 5B shows the control signal 152 transmitted to the optical switch 120 by the at least one waveform generator 150. In response to these control signals 152, the optical switch 120 is selectively configured to transmit the delay-line signal (black) when the gyro signal has a spike in the gyro signal and to transmit the gyro signal (gray) when there is no spike in the gyro signal. The sixth frame of FIG. 5B shows the signal from the photodetector 50. The photons in the delay-line-signal measurement p[2n] (where n is an integer) were created at the same time in the laser as were the photons in the gyro-signal measurement p[2n+1], and therefore they have the same RIN.

Absent any nonreciprocal phase shifts in the optical fiber coil 20 (e.g., Sagnac phase shift; backscattering noise; polarization coupling), and assuming a square-wave modulation with amplitude $\varphi_b$ (e.g., 2$\varphi(t)$−2$\varphi(t-\tau)$=4$\varphi_b$), the ratio between two adjacent measurements can be expressed as:

$$p[2n + 1]/p[2n] = \alpha_g(1 + \cos(4\varphi_b))/2\alpha_d$$

which is independent of the laser power $P_l$, and therefore of the RIN. The measurement of p[2n] can then be used to correct p[2n+1] (e.g., by use of a microprocessor, a field-programmable gate array, a mixer, and/or a lock-in amplifier) such that the RIN has largely been subtracted, leaving only signal caused by non-RIN effects (e.g., Sagnac phase shift; backscattering noise; shot noise). In certain implementations, this technique can be used to simultaneously suppress the deleterious spikes from ever reaching the photodetector 50, and can allow for reduction (e.g., removal; cancellation) of the RIN of the at least one optical source 40, while using a single photodetector 50.

Figure 5C:
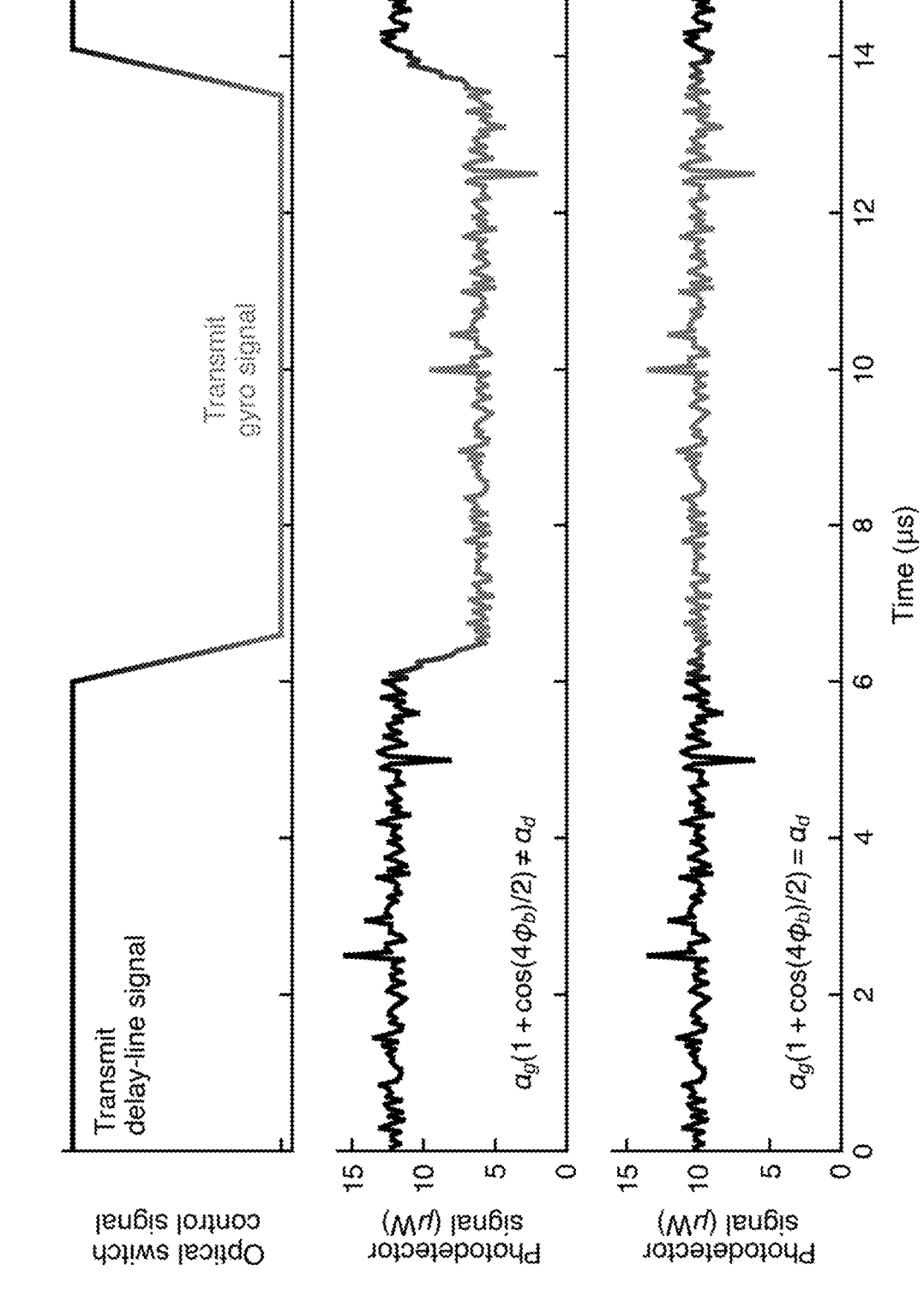
FIG. 5C shows an example control signal provided to the optical switch as a function of time and examples of the photodetector signal as a function of time for two example conditions in accordance with certain implementations described herein.

In certain implementations, $\varphi(t)$, $\alpha_g$, and $\alpha_d$ can be selected or controlled (e.g., by varying the amplitude of $\varphi(t)$, or by changing $\alpha_g$ or $\alpha_d$ with a variable attenuator) such that the average power of the gyro signal and the delay-line signal are approximately equal to one another (e.g., $\alpha_g(1 + \cos(4\varphi_b))/2 = \alpha_d$). FIG. 5C shows an example control signal 152 provided to the optical switch 120 as a function of time and examples of the photodetector signal as a function of time for two example conditions in accordance with certain implementations described herein. As shown in the first frame of FIG. 5C, the control signal 152 (e.g., voltage) provided to the optical switch 120 toggles between the two inputs at twice the proper frequency. When the average power of the two input signals differ, the photodetector signal is a square wave signal at twice the proper frequency, as shown by the second frame of FIG. 5C, with the high-level and low-level values corresponding to the optical powers in the delay-line and gyro signals, respectively. However, using two different values for the powers can have undesirable effects on the demodulation electronics (e.g., sudden periodic changes in the current across a reverse-biased photodiode). The amplitude of this square wave can effectively be reduced to zero by setting $\alpha_g(1 + \cos(4\varphi_b))/2 = \alpha_d$ (e.g., by varying the biasing modulation depth $\varphi_b$, by changing $\alpha_g$ or $\alpha_d$ with a variable attenuator), as shown in the third frame of FIG. 5C. Certain implementations having such a configuration can provide increased stability in the photodetection or demodulation circuits.

While the length of the delay line in FIGS. 5A-5C is substantially equal to one-half the length of the optical fiber coil 20, in certain other implementations, this technique can be employed when the length of the delay line is substantially equal to one-half of an odd integer times the length of the optical fiber coil 20 (e.g., 3L/2, 5L/2, . . . ). For a delay line of length mL/2, where m is an odd integer, the RIN can be subtracted by comparing the measurements p[2n+m−1] and p[2n+1].

Figure 6:
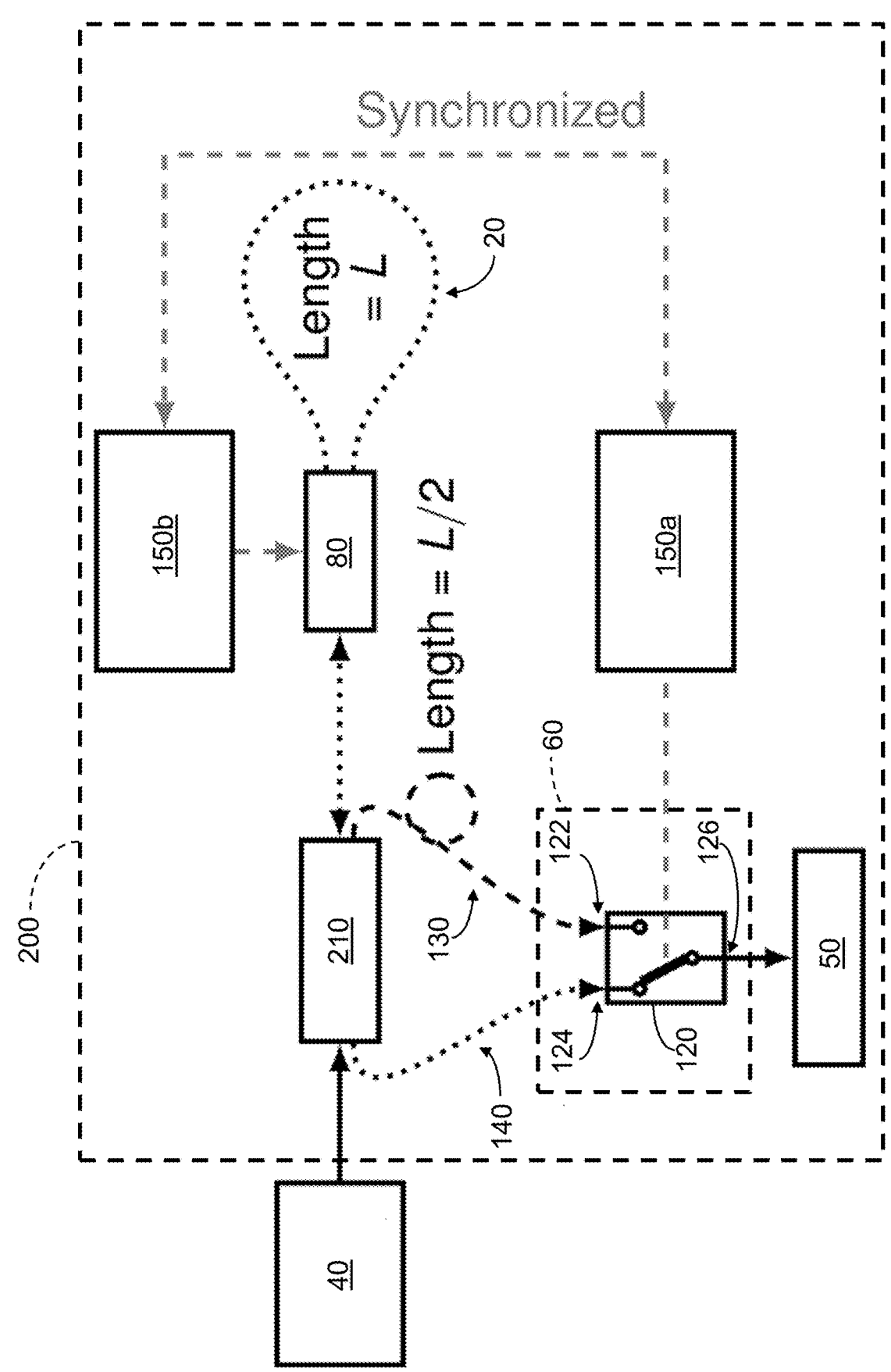
FIG. 6 schematically illustrates another example FOG in accordance with certain implementations described herein.

FIG. 6 schematically illustrates another example FOG 200 in accordance with certain implementations described herein. The FOG 200 comprises a 2×2 directional coupler 210 instead of a circulator 70. The operation of the example FOG 200 is similar to the operation of the example FOG 100 of FIG. 5A, except that the gyro signal is routed to the optical switch through the 2×2 directional coupler 210 instead of a circulator 70.

Figure 7:
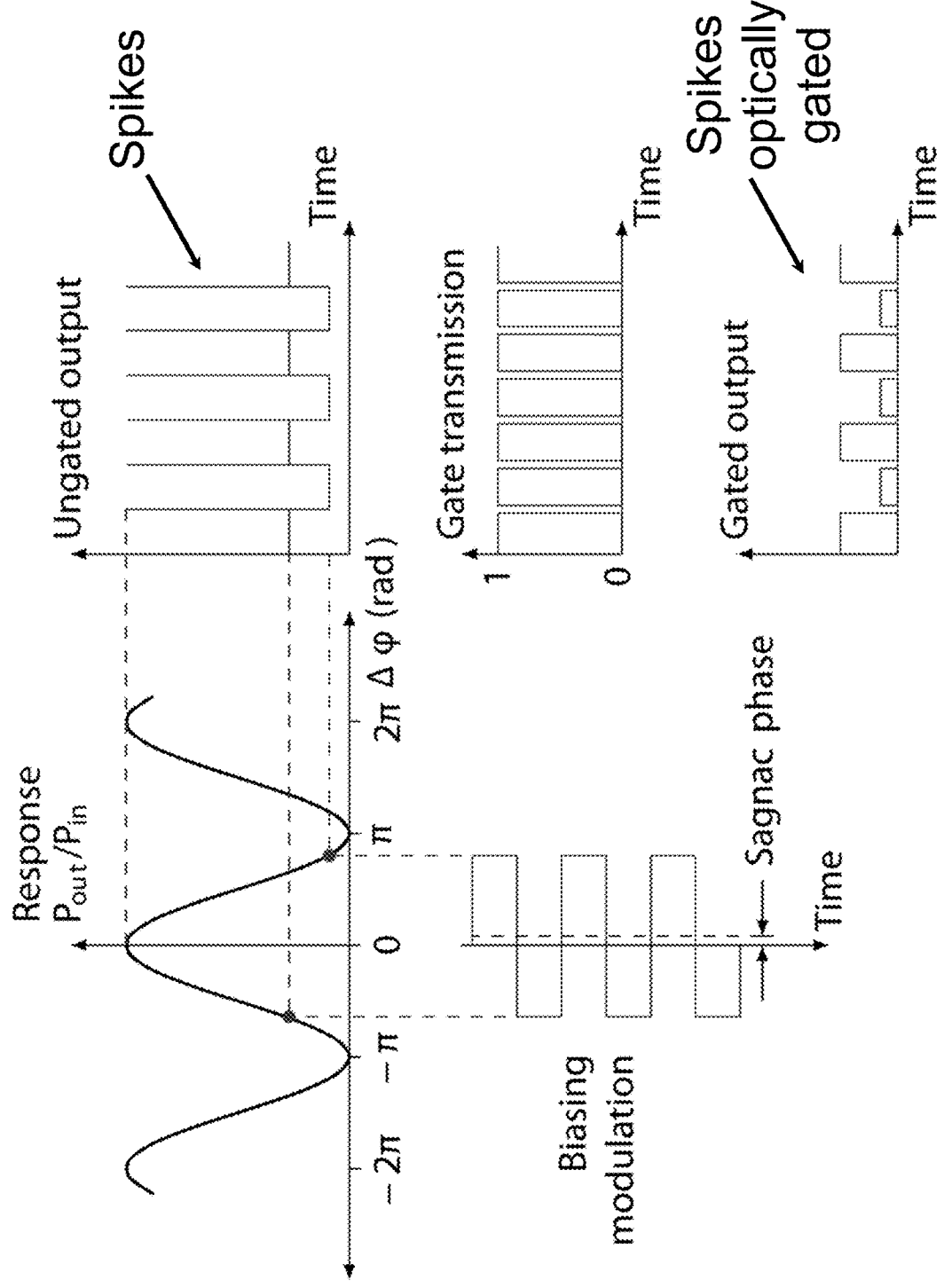
FIG. 7 schematically illustrates the interferometric output of the example FOG of FIG. 4 that is dynamically biased with square-wave modulation at the proper frequency of the optical fiber coil in accordance with certain implementations described herein.

FIG. 7 schematically illustrates the interferometric output of the example FOG 10 of FIG. 4 that is dynamically biased with square-wave modulation at the proper frequency of the optical fiber coil 20 in accordance with certain implementations described herein. For a FOG without an optical intensity modulator (e.g., as shown in FIG. 1), the photodetector receives the ungated optical signal transmitted by the FOG, shown in the top-right graph of FIG. 7 (e.g., the same as the top-right graph of FIG. 2). The ungated optical signal is a square wave with large spikes at the abrupt changes in the biasing voltage that is applied to the phase modulators of the MIOC. In certain implementations, these spikes are optically removed or gated by applying a control voltage to the optical intensity modulator 60 (e.g., a pulse train having pulses synchronized with the abrupt changes of the biasing voltage) such that the optical signals transmitted from the input port 62 to the output port 64 of the optical intensity modulator 60 resemble those shown in the middle-right graph of FIG. 7. In certain implementations, the optical intensity modulator 60 can be biased such that the optical intensity modulator 60 transmits substantially all the optical signals from the input port 62 to the output port 64 most of the time (and vice versa, from the output port 64 to the input port 62), but that every $\tau_g$, the optical intensity modulator 60 is biased such that the optical intensity modulator 60 transmits substantially none of the optical signals from the input port 62 to the output port 64 (and vice versa, from the output port 64 to the input port 62). Because the spikes are brief, the time periods during which the optical intensity modulator 60 blocks substantially all the optical signals from being transmitted from the input port 62 to the output port 64 (and vice versa) can be a small fraction of a half-period, namely a few hundred nanoseconds or less. For example, letting r represent the duty cycle of the gating waveform, with r=0 representing the limit where the modulator 60 transmits 100% of the time, and r=1 representing the limit where the modulator 60 blocks 100% of the signal at all times, the range of r can be quite broad. A lower limit of r for the duty cycle can correspond to the smallest amount of time for blocking substantially all of the spike (e.g., r=1% for very high-bandwidth electronics). As r is increased from its lower limit, more signal is blocked by the modulator 60, and the signal-to-noise ratio of the FOG 10 degrades and causes an increase in the angle random walk (ARW). Depending on the demodulation scheme of the FOG 10, the value of r can be as large as 50% and still only cause a modest degradation in performance (see, U.S. Pat. No. 4,728,192). The optical signal detected by the photodetector 50 is the product of the top-right graph and the middle-right graph of FIG. 7, and the spikes are optically gated (e.g., attenuated; blocked; removed) from the optical signal detected by the photodetector 50, as shown in the bottom-right graph of FIG. 7.

In certain implementations, the optical intensity modulator 60 is positioned immediately after the optical source 40 (e.g., laser) (e.g., at the location labeled "A" of the example FOG 10 in FIG. 4). For example, in certain implementations, the optical source 40 (e.g., laser) is operated at relatively high power (e.g., several mW or more) to maximize the output signal-to-noise ratio of the FOG 10. The maximum power that can be launched into a FOG is sometimes limited by the risk of optical damage at the circulator 70, the fiber-to-bulk-optics connections, and/or the lithium niobate MIOC 80 (e.g., photodarkening). Certain implementations in which the optical intensity modulator 60 is positioned immediately after the optical source 40 and is configured to periodically block some of the optical power have the benefit of reducing the average power that travels in these components, thereby reducing the risk of optical damage.

In certain other implementations, the optical intensity modulator is positioned at other locations of the FOG 10. For example, the optical intensity modulator 60 can be positioned in an optical path between the MIOC 80 and the optical fiber coil 20 (e.g., at the location labeled "B" in FIG. 4) or is located at a position along the optical fiber coil 20. As a matter of practicality, the optical intensity modulator 60 can be fabricated directly onto the MIOC 80 (e.g., between the Y-junction 82 of the MIOC 80 and the optical fiber coil 20).

Figure 8:
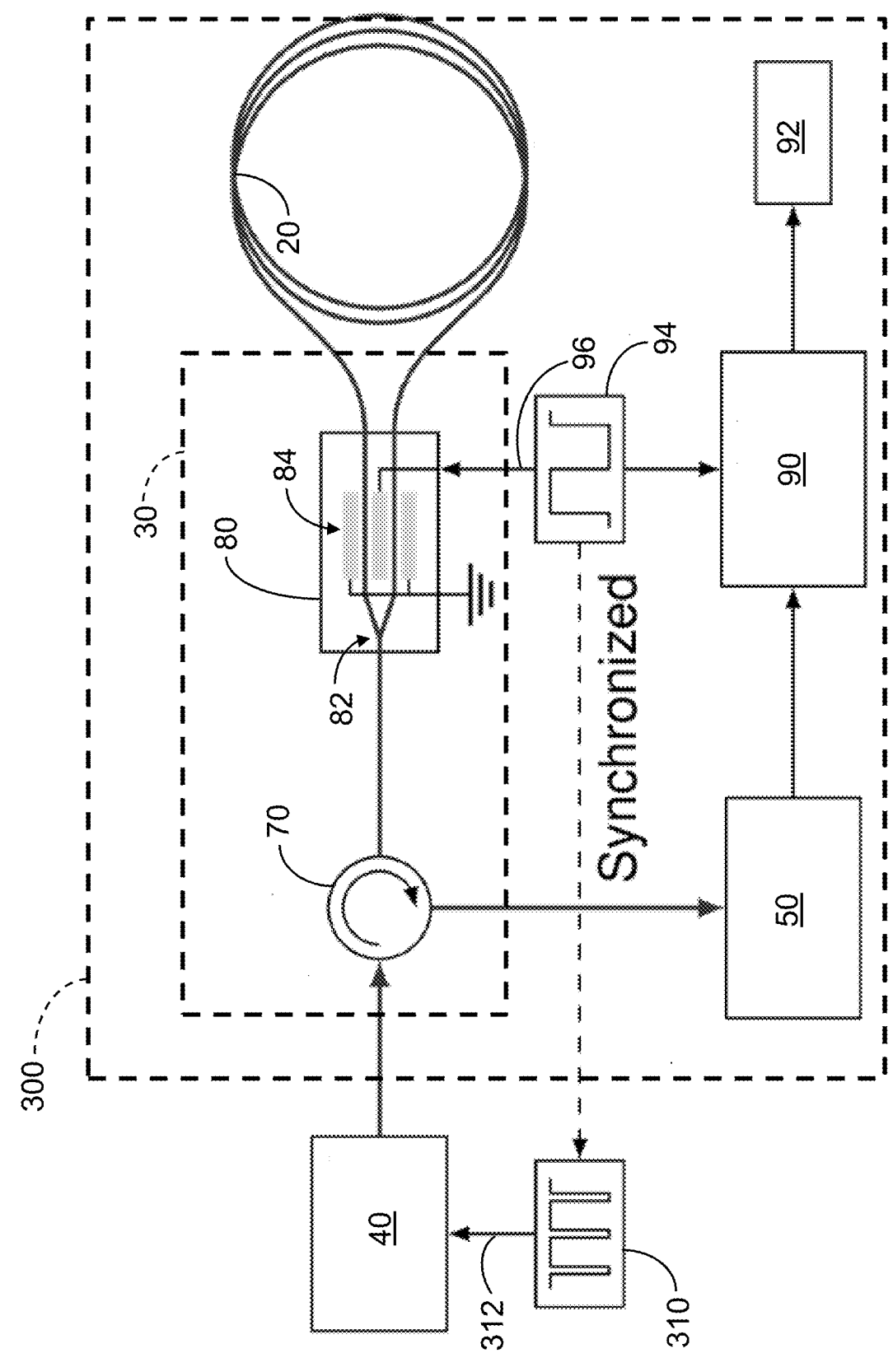
FIG. 8 schematically illustrates another example FOG utilizing optical gating in accordance with certain implementations described herein.

FIG. 8 schematically illustrates another example FOG 300 utilizing optical gating in accordance with certain implementations described herein. The example FOG 300 of FIG. 8 comprises an optical source 40 receiving a modulated drive current 312 from a drive current generator 310, with the drive current modulation synchronized to the biasing modulation (e.g., voltage) 96 applied to the MIOC 80 such that no drive current is supplied to the optical source 40 while the biasing modulation 96 is changing from negative to positive or vice versa. In the example FOG 300 of FIG. 8, the combination of the optical source 40 and the drive current generator 310 can be considered to be an optical gate configured to time modulate the input optical signals 42. During the time periods when the driver current is zero or significantly below the laser threshold current, the optical source 40 does not generate the input optical signals 42, so no input optical signals 42 are sent into the FOG 300, and thus no spikes are created. Furthermore, the drive current 312 provided to the optical source 40 can be toggled on and off multiple times within a single time-of-flight of optical signals 44a, 44b through the sensing optical fiber coil 20. For example, the optical source 40 can be shut off momentarily to prevent a spike, and then again later after a time duration of $\tau_g/2$. As long as the optical source 40 is off while the biasing modulation 96 is changing, no spike is created.

Figure 9:
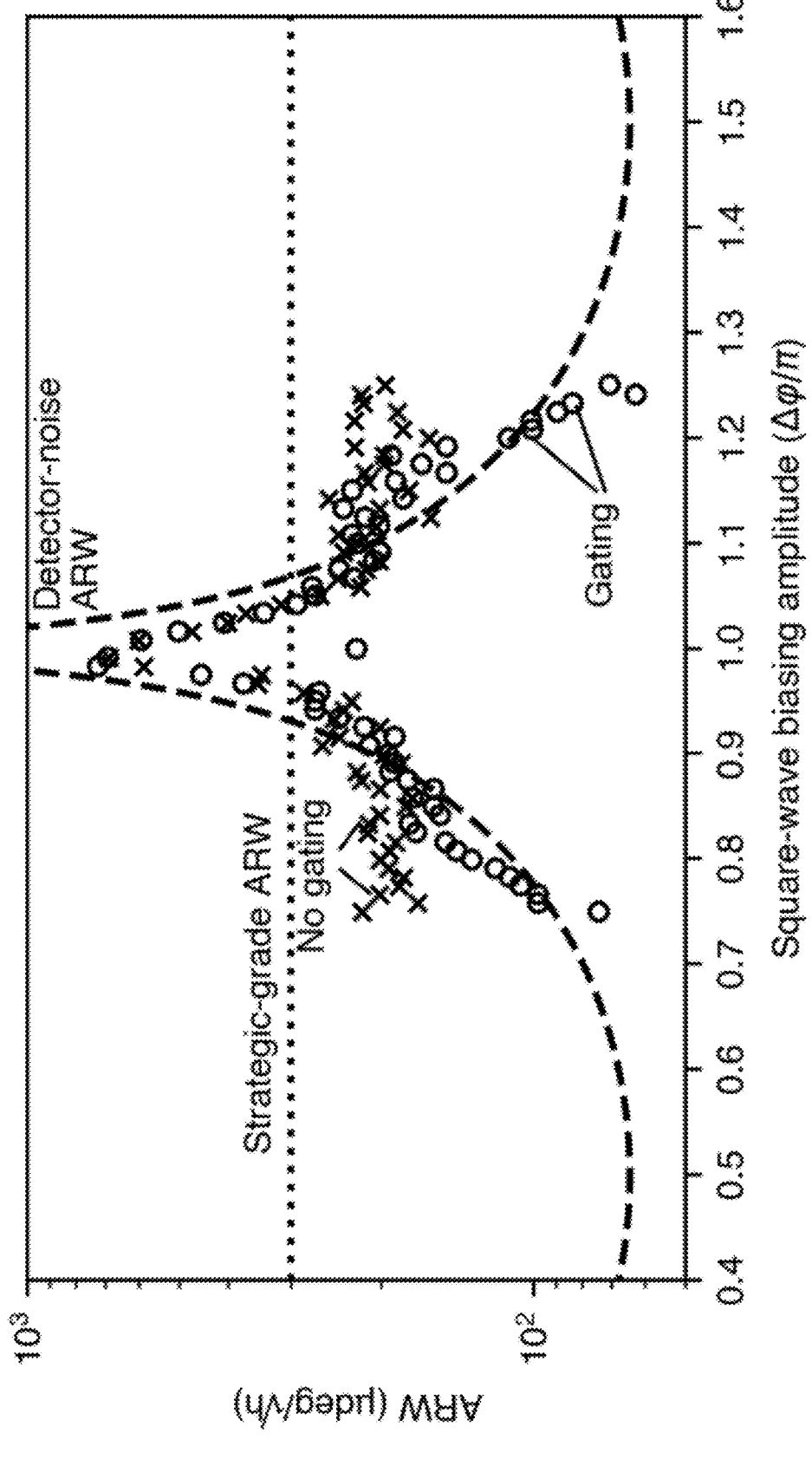
FIG. 9 shows the measured ARW plotted as a function of the applied biasing modulation using the example FOG of FIG. 8 in accordance with certain implementations described herein.

FIG. 9 schematically illustrates measurements in which optical gating is used to reduce the noise (e.g., ARW) caused by spikes using the example FOG 300 of FIG. 8 in accordance with certain implementations described herein. While the measurements of FIG. 9 were obtained using the example FOG 300 of FIG. 8, other measurements using the example FOG 10 of FIG. 4 also exhibited a reduction of ARW.

For the measurements of FIG. 9, the optical fiber coil 20 comprised an optical fiber having a length of about 3240 meters and the optical fiber coil 20 having a circular shape with a diameter of 12 cm, and the optical source 40 comprised a 10-MHz laser that was broadened to about 20 GHz using the methods described in J. N. Chamoun and M. J. F. Digonnet. "Aircraft-navigation-grade laser-driven FOG with Gaussian-noise phase modulation," *Opt. Lett.*, vol. 42, no. 8. pp. 1600-1603 (2017).

In contrast to FOGs interrogated with a conventional Er-doped superfluorescent fiber source (SFS), the example FOG 300 of FIG. 8 was not limited by the excess noise (or relative intensity noise) of the SFS. The backscattering noise due to coherent interaction between the primary CW and CCW optical signals and the light backscattered in the optical fiber coil 20 was calculated to be on the order of a few tens of μdeg/√Hz (see S. W. Lloyd, M. J. F. Digonnet, "Modeling coherent backscattering errors in fiber optic gyroscopes for sources of arbitrary line width," *J. Lightwave Technol.*, vol. 31, no. 13, pp. 2070-2078 (2013)). Thus, the example FOG 300 of FIG. 8 was limited primarily by photodetector noise, spike noise, and shot noise. In the measurements of FIG. 9, the amplitude of the biasing modulation 96 was varied between 0.75π and 1.25π. At each biasing modulation setting, one minute of data was collected, and the ARW was inferred from the calculated Allan deviation of these data. For comparison, the measurements were repeated with the optical gating turned off.

FIG. 9 shows the measured ARW plotted as a function of the applied biasing modulation 96. The circles represent ARW data measured with optical gating, and the crosses represent ARW data measured without optical gating (e.g., baseline data). The dashed curve represents the contribution of photodetector noise to the overall ARW. To understand the shape of the detector noise to the overall ARW, consider the case in which the amplitude of the square-wave biasing modulation 96 is π, or an odd multiple of π. The Sagnac interferometer is then biased on a dark fringe, and the sensitivity of the photodetector 50 to rotation (dP/dΩ) is zero. While the FOG 300 is irresponsive to a small rotation rate to first order on that rate, there is noise in the photodetector 50 (e.g., photodiode) that arises from photodiode dark current and thermal noise in the transimpedance amplifier resistor. Hence, at this setting, the ARW (which is the inverse of the signal-to-noise ratio) is infinite, as seen in the dashed curve of FIG. 9. When the amplitude of the square-wave biasing modulation 96 is varied in either direction from an odd multiple of π, the Sagnac interferometer is no longer biased on a dark fringe, and the photodetector 50 (e.g., photodiode) receives photocurrent, which increases the signal-to-noise ratio, and thus reduces (e.g., improves) the ARW. The electronic noise in the photodetector 50 (e.g., Johnson-Nyquist noise in the transimpedance amplifier) is independent of any changes in the optical signal. However, the interferometric sensitivity is maximized when the amplitude of the square-wave biasing modulation 96 is a half of an odd-integer-multiple of π (see FIG. 9), which can minimize the impact of the constant electronic noise in the photodetector 50. The photodetector noise is least detrimental when the biasing modulation 96 is a multiple of π, which is when the interferometric sensitivity is minimized. The horizontal dotted line at ARW of 300 μdeg/√h indicates the performance benchmark for strategic-grade ARW, as specified in H. C. Lefèvre, "*The Fiber-Optic Gyroscope*," Boston: Artech House. $2^{nd}$ Ed. pp. 26 (2014).

As mentioned above, when Δφ is close to π, the Sagnac interferometer is biased near a dark fringe, the interferometric sum of the combined optical signals 44a, 44b returning to the first port of the MIOC 80 after having propagated through the optical fiber coil 20 is near a local minimum, and the sensitivity dP/dΩ is nearly zero (the same problem of poor sensitivity happens when the Sagnac interferometer is operated at a local maximum, where the interferometric sum of the combined optical signals 44a, 44b is near a local maximum). Consequently, the contribution of the spike noise to the total ARW is small compared to the photodetector noise's contribution to the total ARW, and the photodetector noise dominates. As shown in FIG. 9, when Δφ is close to π, the measured ARW with optical gating and without optical gating fall essentially on top of each other, and are very close to the theoretical photodetector noise limit indicated by the dashed curve.

As Δφ is increased or decreased away from this dark fringe, the average signal returning from the optical fiber coil 20 increases, the sensitivity improves so the photodetector noise (expressed in units of ARW) decreases, and the ARW from the spikes becomes dominant. As seen in FIG. 9, in certain ranges of the biasing modulation 96 (e.g., below about 0.87π and above about 1.13π), the ARW measured with optical gating (circles) in accordance with certain implementations described herein is lower than the ARW measured without optical gating (crosses). When the optical gating is enabled in these two example ranges of the biasing modulation 96, the ARW from the spikes is substantially attenuated (e.g., reduced; eliminated), and the example FOG 300 of FIG. 8 again becomes photodetector-noise limited, reaching values of ARW less than 100 μdeg/√h. As shown in FIG. 9, the lowest ARW measured with this example FOG 300 was 62 μrad/√h, which is approximately a factor of five lower than the requirement for a strategic-grade FOG. The example FOG 300 in accordance with certain implementations described herein is the first laser-driven FOG that meets this ARW requirement for a strategic-grade FOG.

As the Δφ continues to be moved farther from the dark fringe, the DC optical power detected by the photodetector increases. For large amounts of DC power, the photodetector becomes saturated, and the photodetector response is no longer linear. When the photodetector is saturated, it becomes less sensitive (and possibly much less sensitive) to small variations in incident optical power, and the noise in the output is decreased (sec, e.g., the data points at the extreme left and right of FIG. 7 that lie below the dashed curve indicative of the theoretical contribution of photodetector noise to the overall ARW).

In certain implementations described herein, the limitations on the ARW of an optically gated broadened-laser-driven FOG are primarily photodetector noise and shot noise. The photodetector noise can be reduced by using a larger resistor in the transimpedance amplifier (e.g., large gain), and the shot-noise contribution to the ARW can be reduced by increasing the laser drive current and thus the received power. As the combination of photodetector noise and shot noise is reduced, the backscattering noise becomes the dominant source of noise. The backscattering noise can then be reduced by using a optical fiber coil 20 with a longer optical fiber (see, e.g., T. A. Morris, M. J. F. Digonnet. "Broadened-laser-driven polarization-maintaining hollow-core fiber optic gyroscope." Accepted for publication in *J. of Lightwave Technol.* (2019)), an optical fiber coil 20 with an optical fiber having a lower backscattering coefficient, and/or an optical source 40 with a broader linewidth (but not so much broader that excess noise becomes dominant).

FIG. 10 is a flow diagram of an example method 400 in accordance with certain implementations described herein. In an operational block 410, the method 400 comprises splitting each input optical signal 42 of a plurality of input optical signals 42 into a first optical signal 44a and a second optical signal 44b. In an operational block 420, the method 400 further comprises phase modulating one or both of the first optical signal 44a and the second optical signal 44b. In an operational block 430, the method 400 further comprises propagating the first optical signal 44a and the second optical signal 44b through an optical fiber coil 20 such that the first optical signal 44a propagates along a first direction through the optical fiber coil 20 and the second optical signal 44b propagates along a second direction through the optical fiber coil 20, the second direction opposite to the first direction. In an operational block 440, the method 400 further comprises combining the first and second optical signals 44a, 44b after propagating through the optical fiber coil 20. In an operational block 450, the method 400 further comprises detecting the combined first and second optical signals 44a, 44b. In an operational block 460, the method 400 further comprises time modulating, synchronously with said phase modulating, the first and second optical signals 44a, 44b before said combining the first and second optical signals 44a, 44b and/or the input optical signals 42.

For example, said time modulating the first and second optical signals 44a, 44b can be performed prior to the first and second optical signals 44a, 44b propagate through the optical fiber coil 20, while the first and second optical signals 44a, 44b propagate through at least a portion of the optical fiber coil 20, and/or after the first and second optical signals 44a, 44b propagate through the optical fiber coil 20. For another example, said time modulating the input optical signals can be performed by time modulating a drive current 312 provided to at least one optical source 40 configured to generate the input optical signals 42. In certain implementations, the method 400 further comprises polarizing the input optical signals 42 prior to propagating the first and second optical signals 44a, 44b through the optical fiber coil 20.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of fiber optic gyroscopes, various implementations described herein can be incorporated in a variety of other suitable devices, methods, and contexts. More generally, as can be appreciated, certain implementations described herein can be used in a variety of other optical device contexts.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

Various implementations have been described above. Although this invention has been described with reference to these specific implementations, the descriptions are intended to be illustrative and are not intended to be limiting. Various modifications and applications may occur to those skilled in the art without departing from the true spirit and scope of the invention as defined in the claims. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. A fiber optic gyroscope comprising:

an optical fiber coil;

at least one optical circuit in optical communication with the optical fiber coil and configured to be in optical communication with at least one optical source, the at least one optical circuit configured to receive input optical signals generated by the at least one optical source, to split each input optical signal into a first optical signal and a second optical signal, to phase modulate one or both of the first optical signal and the second optical signal, to transmit the first optical signal and the second optical signal to the optical fiber coil such that the first and second optical signals counter-propagate through the optical fiber coil, to receive the first and second optical signals after counterpropagating through the optical fiber coil, to combine the first and second optical signals after counterpropagating through the optical fiber coil, and to transmit the combined first and second optical signals to at least one photodetector; and at least one optical gate configured to controllably time modulate intensity of the input optical signals and/or intensity of the first and second optical signals prior to being combined, said time modulating synchronized with said phase modulating.

2. The fiber optic gyroscope of claim 1, wherein the at least one optical gate comprises an optical intensity modulator comprising an input port and an output port.

3. The fiber optic gyroscope of claim 2, wherein the optical intensity modulator is in an optical path between the at least one optical source and the optical circuit.

4. The fiber optic gyroscope of claim 3, wherein the at least one optical circuit further comprises an optical coupler configured to receive the input optical signals from the at least one optical source, to transmit at least a portion of the input optical signals to other components of the at least one optical circuit, to receive the combined first and second optical signals from the other components of the at least one optical circuit, and to transmit the combined first and second optical signals to the at least one photodetector.

5. The fiber optic gyroscope of claim 4, wherein the optical intensity modulator is in an optical path between the at least one optical source and the at least one optical coupler.

6. The fiber optic gyroscope of claim 4, wherein the at least one optical coupler comprises a circulator.

7. The fiber optic gyroscope of claim 4, wherein the at least one optical coupler comprises a 2×2 directional coupler.

8. The fiber optic gyroscope of claim 2, wherein the optical intensity modulator is in an optical path between the at least one optical circuit and the optical fiber coil.

9. The fiber optic gyroscope of claim 2, wherein the optical intensity modulator is configured to controllably and selectively either transmit optical signals received at the input port to the output port or prevent optical signals received at the input port from being transmitted to the output port.

10. The fiber optic gyroscope of claim 9, wherein the at least one phase modulator is driven by a square-wave biasing modulation voltage and the optical intensity modulator is driven by a control voltage synchronized with the square-wave biasing modulation voltage such that the optical intensity modulator blocks transmission of optical signals from the input port to the output port while the square-wave biasing modulation voltage is changing, and the optical intensity modulator transmits optical signals from the input port to the output port at other times.

11. The fiber optic gyroscope of claim 10, wherein the at least one phase modulator is driven by a serrodyne modulation voltage.

12. The fiber optic gyroscope of claim 9, wherein the at least one phase modulator is driven by a serrodyne modulation voltage.

13. The fiber optic gyroscope of claim 1, wherein the at least one optical gate comprises the at least one optical source and a drive current generator configured to provide a modulated drive current to the at least one optical source.

14. The fiber optic gyroscope of claim 13, wherein the at least one phase modulator is driven by a square-wave biasing modulation voltage and the modulated drive current is synchronized with the square-wave biasing modulation voltage such that a drive current is supplied to the at least one optical source is below a predetermined level while the square-wave biasing modulation voltage is changing, and the drive current supplied to the at least one optical source is at or above the predetermined level at other times.

15. The fiber optic gyroscope of claim 1, wherein the at least one optical gate comprises an optical switch.

16. A method comprising:

splitting each input optical signal of a plurality of input optical signals into a first optical signal and a second optical signal;

phase modulating one or both of the first optical signal and the second optical signal;

propagating the first optical signal and the second optical signal through an optical fiber coil such that the first optical signal propagates along a first direction through the optical fiber coil and the second optical signal propagates along a second direction through the optical fiber coil, the second direction opposite to the first direction;

combining the first and second optical signals after propagating through the optical fiber coil;

detecting the combined first and second optical signals; and time modulating, synchronously with said phase modulating, intensity of the first and second optical signals before said combining the first and second optical signals and/or intensity of the input optical signals.

17. The method of claim 16, wherein said time modulating the first and second optical signals is performed prior to the first and second optical signals propagate through the optical fiber coil.

18. The method of claim 16, wherein said time modulating the first and second optical signals is performed while the first and second optical signals propagate through at least a portion of the optical fiber coil.

19. The method of claim 16, wherein said time modulating the first and second optical signals is performed after the first and second optical signals propagate through the optical fiber coil.

20. The method of claim 16, wherein said time modulating the input optical signals is performed by time modulating a drive current provided to at least one optical source configured to generate the input optical signals.

* * * * *